United States Patent
Torres et al.

(10) Patent No.: US 10,899,237 B2
(45) Date of Patent: Jan. 26, 2021

(54) METHODS AND SYSTEM FOR TORQUE VECTORING

(71) Applicant: Ford Global Technologies, LLC, Dearborn, MI (US)

(72) Inventors: Joseph Torres, Dearborn, MI (US); Paul Moubarak, Redford Township, MI (US); Jonathan Sullivan, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 16/124,522

(22) Filed: Sep. 7, 2018

(65) Prior Publication Data

US 2020/0079229 A1     Mar. 12, 2020

(51) Int. Cl.
*B60L 15/20*     (2006.01)

(52) U.S. Cl.
CPC ....... *B60L 15/2036* (2013.01); *B60L 2240/12* (2013.01); *B60L 2240/24* (2013.01); *B60L 2240/423* (2013.01); *B60L 2250/28* (2013.01)

(58) Field of Classification Search
None
See application file for complete search history.

(56) References Cited

U.S. PATENT DOCUMENTS

| 7,056,252 | B2 | 6/2006 | Gumpoltsberger et al. |
| 8,012,057 | B2 | 9/2011 | Meixner |
| 2001/0003805 | A1* | 6/2001 | Koibuchi ............... B60T 8/175 701/9 |
| 2008/0082243 | A1* | 4/2008 | Villella ............. B60K 17/3462 701/70 |
| 2012/0083378 | A1* | 4/2012 | Severinsson .......... B60W 10/08 475/150 |
| 2014/0162842 | A1 | 6/2014 | Severinsson et al. |
| 2015/0151747 | A1* | 6/2015 | Fairgrieve ................ B60T 7/22 701/91 |

* cited by examiner

*Primary Examiner* — Jonathan M Dager
*Assistant Examiner* — Garrett F Evans
(74) *Attorney, Agent, or Firm* — David Kelley; McCoy Russell LLP

(57) ABSTRACT

Methods and systems are provided for operating a vehicle during operating conditions where wheel slip may occur. In one example, a torque vectoring electric machine torque output is adjusted to direct propulsion torque from one wheel to a different wheel. Additionally, the propulsive torque is adjusted responsive to a driver demand wheel torque.

16 Claims, 4 Drawing Sheets

METHODS AND SYSTEM FOR TORQUE VECTORING

FIELD

The present description relates generally to methods and systems for controlling torque distribution between wheels of a vehicle. The methods and systems may be particularly useful for vehicles that are electrically propelled.

BACKGROUND/SUMMARY

A vehicle may turn from time $t_0$ time and the vehicle's weight distribution may change from side to side while the vehicle is negotiating the turn. The shift in vehicle weight may cause a driven wheel on the side of the turn to slip and lose traction. The slipping wheel may reduce vehicle stability and propulsion efficiency. One way to reduce wheel slip is to apply a brake of the wheel that is slipping; however, applying the brake may slow the vehicle and increase energy consumption by the vehicle. Therefore, it may be desirable to provide a way of reducing wheel slip of a vehicle that is negotiating a turn while achieving a high level of energy conservation by the vehicle.

The inventors herein have recognized the above-mentioned issues and have developed a vehicle operating method, comprising: adjusting torque output of a torque vectoring electric machine via a controller in response to a speed difference between an actual wheel speed and a natural wheel speed.

By adjusting a torque output of a torque vectoring electric machine, it may be possible to provide the technical result of reducing vehicle wheel slip while conserving energy to propel the vehicle. Further, torque control of the torque vectoring electric machine and left and right axle shafts of an axle may be improved by adjusting the torque output of the torque vectoring electric machine responsive to a speed difference between an actual wheel speed and a natural wheel speed. In particular, small speed differences may cause a controller to generate small torque changes in the torque output of the torque vectoring electric machine while larger speed differences may cause the controller to generate larger torque changes in the torque output of the torque vectoring electric machine so that wheel slip may be controlled quickly and smoothly.

The present description may provide several advantages. In particular, the approach provides torque control for each wheel coupled to an axle. Further, the approach does not provide friction braking so vehicle fuel conservation may be improved. In addition, the approach controls a single electric machine to control torque of both left and right driven wheels.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
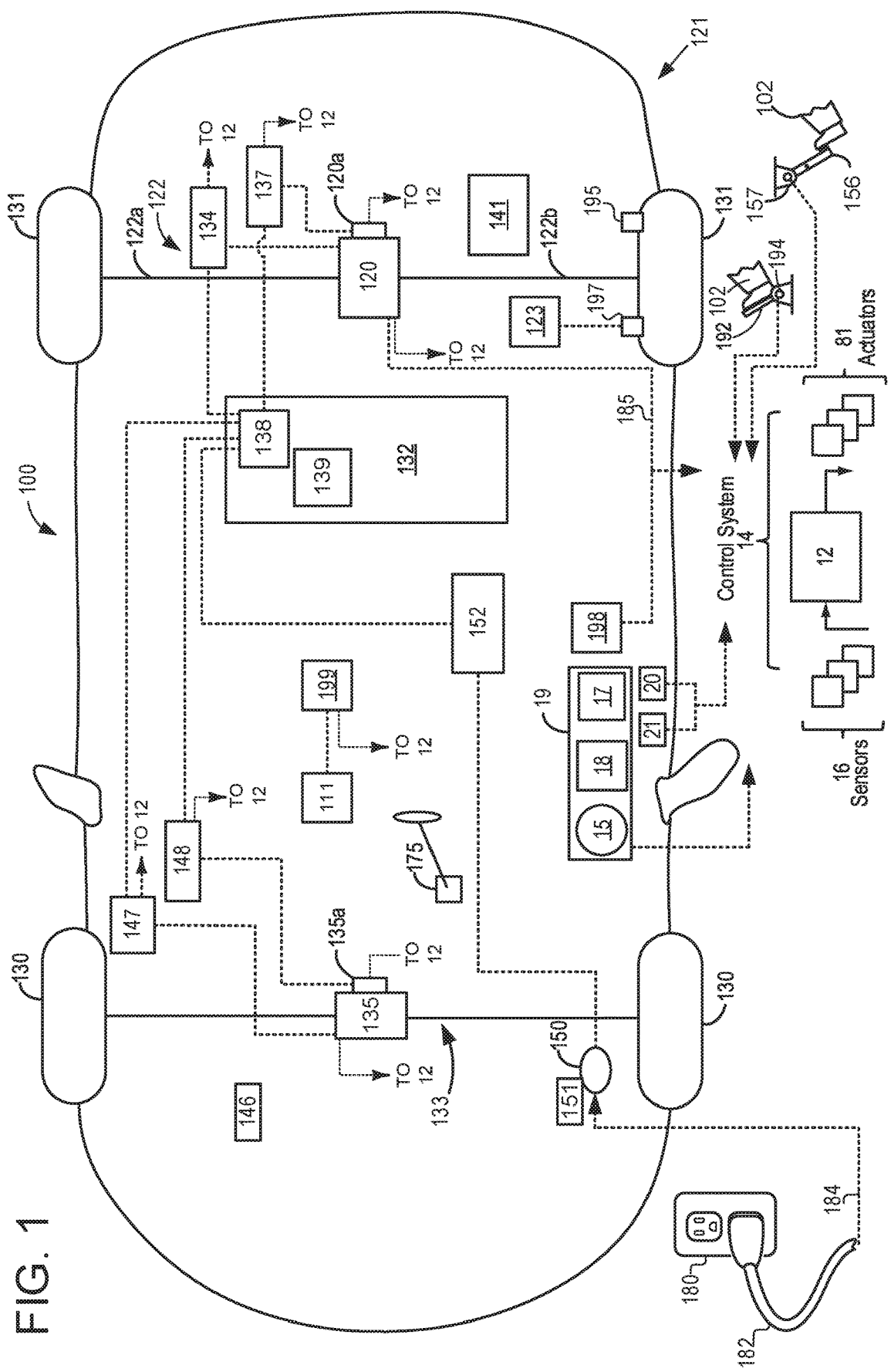
FIG. 1 is a schematic diagram of a vehicle driveline.
Figure 2:
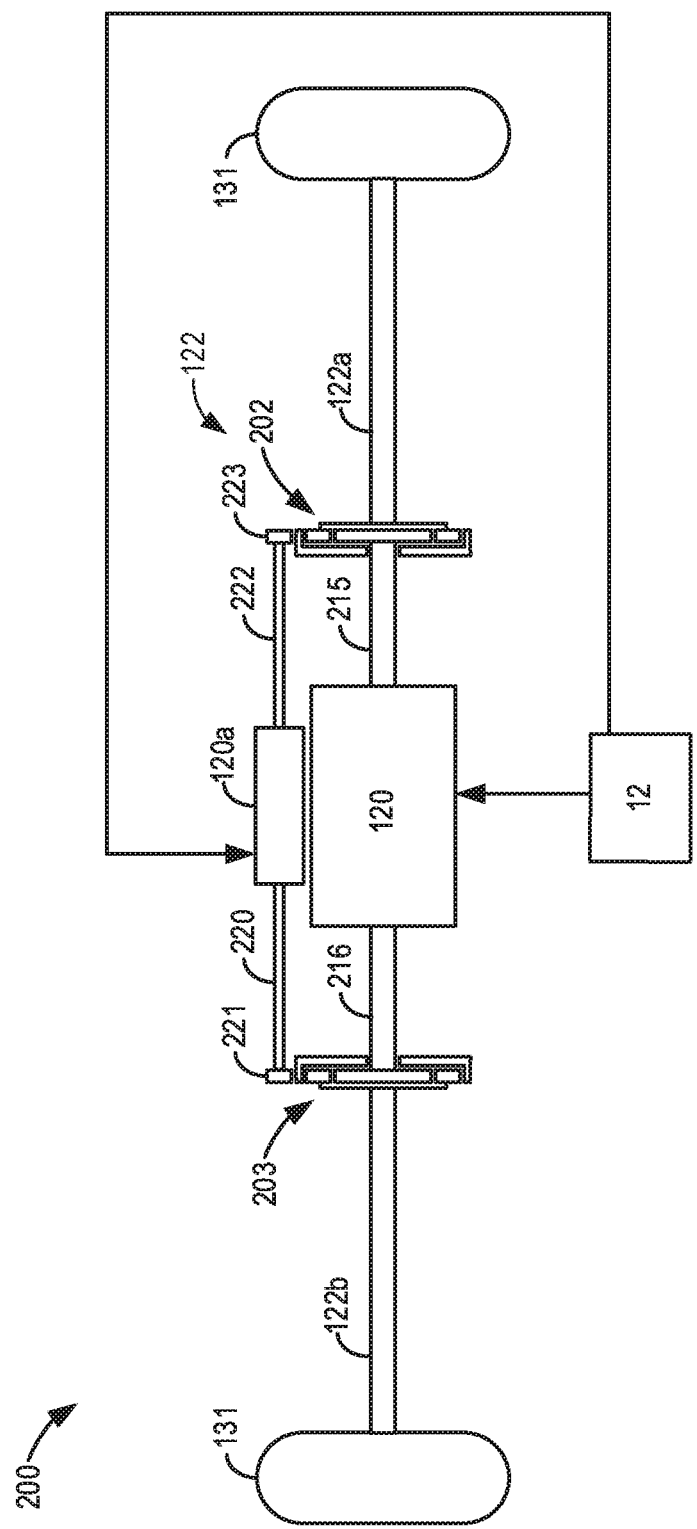
FIG. 2 is a detailed view of an axle that includes a propulsive force electric machine, a torque vectoring electric machine, and gear sets.
Figure 3:
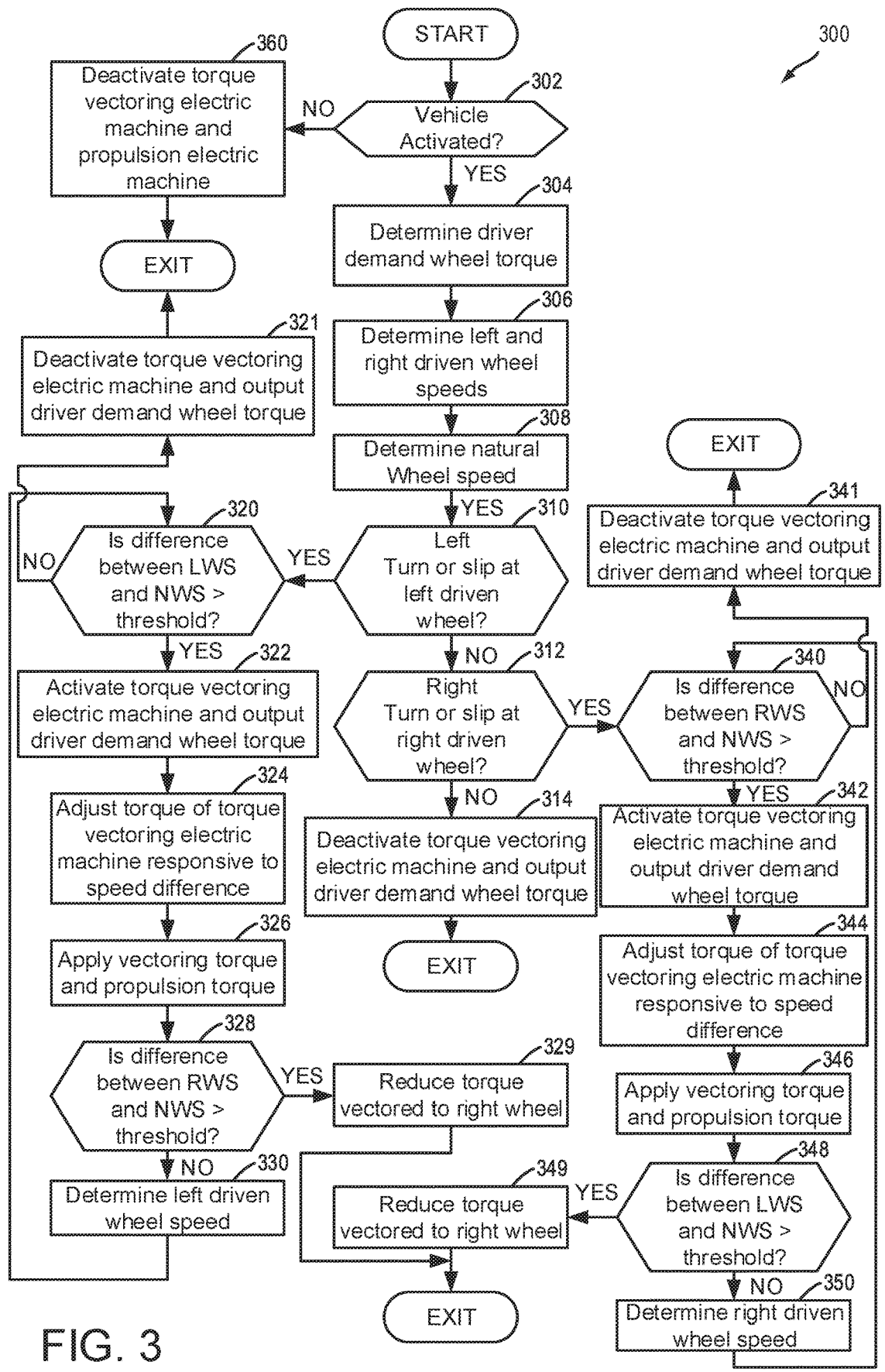
FIG. 3 is a flowchart of a method for controlling torque delivery of a vehicle axle.
Figure 4:
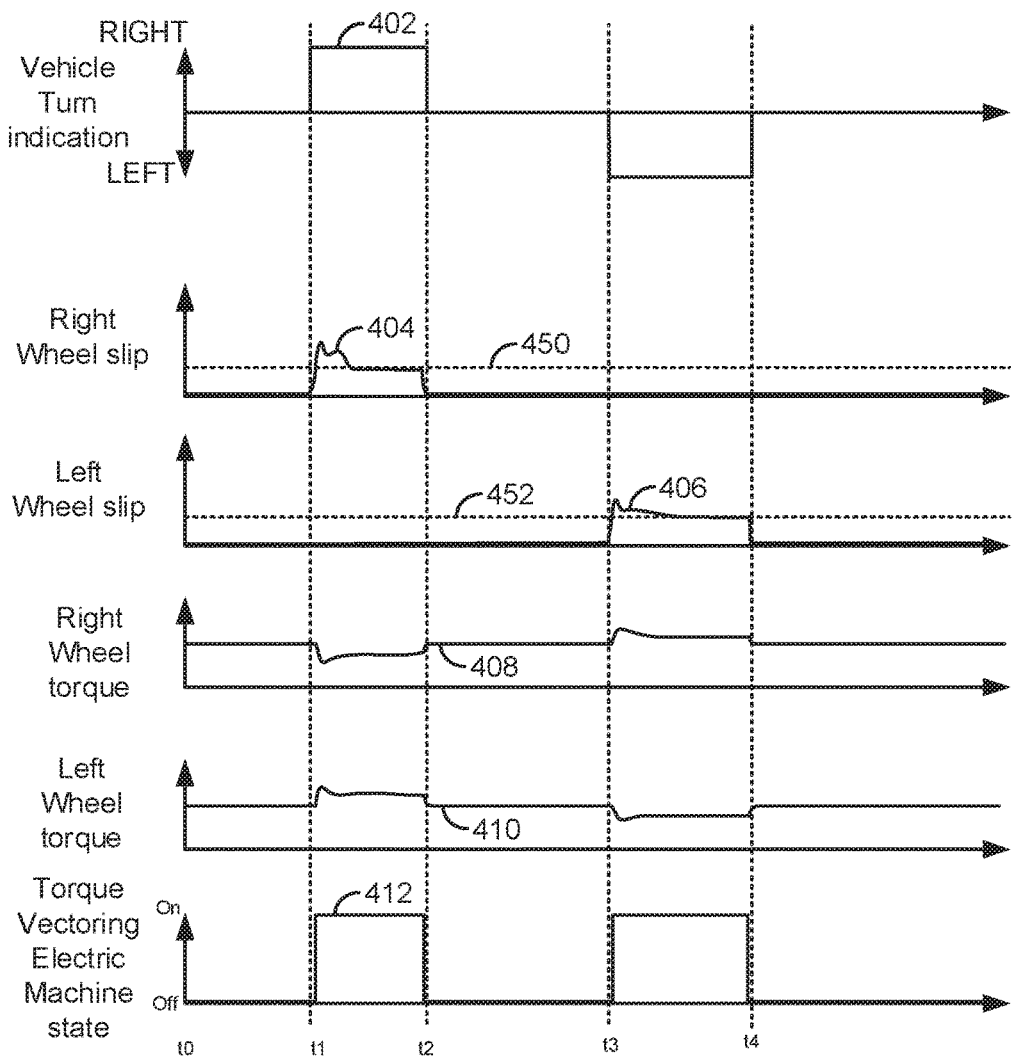
FIG. 4 is a prophetic vehicle operating sequence according to the method of FIG. 3.

The following description relates to systems and methods for operating a vehicle. FIG. 1 shows an example vehicle system that includes a driveline with one or more electrical propulsion sources. A detailed view of an axle system of the vehicle of FIG. 1 is shown in FIG. 2. A method for vectoring torque between wheels of an axle is shown in FIG. 3. An example vehicle operating sequence to control torque delivered to vehicle wheels according to the method of FIG. 3 is shown in FIG. 4.

FIG. 1 illustrates an example vehicle propulsion system 100 for vehicle 121. Throughout the description of FIG. 1, mechanical connections between various components are illustrated as solid lines, whereas electrical connections between various components are illustrated as dashed lines. Vehicle propulsion system 100 is shown with a first electric machine (e.g., a propulsive force electric machine) 120 and a second electric machine (e.g., a propulsive force electric machine) 135 for propelling vehicle 121. However, in other examples, vehicle 121 may include only one electrical machine for providing propulsive force. Electric machine 120 and electric machine 135 are controlled via controller 12. The controller 12 receives signals from the various sensors shown in FIGS. 1 and 2. In addition, controller 12 employs the actuators shown in FIGS. 1 and 2 to adjust driveline operation based on the received signals and instructions stored in memory of controller 12. In some examples, the vehicle propulsion system 100 may include an internal combustion engine (not shown).

Vehicle propulsion system 100 has a front axle 133 and a rear axle 122. In some examples, rear axle may comprise two half shafts, for example first half shaft 122a, and second half shaft 122b. Vehicle propulsion system 100 further includes front wheels 130 and rear wheels 131. In this example, front wheels 130 and/or rear wheels 131 may be driven via electrical propulsion sources. The rear axle 122 is coupled to electric machine 120. Electric machine 120 is shown incorporated into axle 122 and electric machine 135 is shown incorporated into front axle 133.

Electric machines 120, 120a, 135, and 135a may receive electrical power from onboard electrical energy storage device 132. Furthermore, electric machines 120 and 135 may provide a generator function to convert the vehicle's kinetic energy into electrical energy, where the electrical energy may be stored at electric energy storage device 132 for later use by the electric machine 120 and/or 135. A first inverter system controller (ISC1) 134 may convert alternating current generated by electric machine 120 to direct current for storage at the electric energy storage device 132 and vice versa. A second inverter system controller (ISC2) 147 may convert alternating current generated by electric machine 135 to direct current for storage at the electric energy storage device 132 and vice versa. A third inverter system controller (ISC3) 137 may convert DC current from electric energy storage device 132 to an alternating current used by electric machine 120a. A fourth inverter system controller (ISC4) 148 may convert DC current from electric energy storage device 132 to an alternating current used by electric machine 135a. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120, torque vectoring electric machine 120a, energy storage device 132, electric machine 135, torque vectoring electric machine 135a, etc. Control system 14 may receive sensory feedback information from one or more of electric machine 135, electric machine 120, energy storage device 132, etc. Further, control system 14 may send control signals to one or more of electric machine 135, torque vectoring electric machine 135a, electric machine 120, torque vectoring electric machine 120a, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 and electric machine 135 may propel the vehicle by utilizing a stationary electric power source.

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include an ambient temperature/humidity sensor 198. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust electric machine output and/or the torque vectoring electric machines to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 gray be electrically coupled to controller 12.

One or more tire pressure monitoring sensors (TPMS) may be coupled to one or more tires of wheels in the vehicle. For example, FIG. 1 shows a tire pressure sensor 197 coupled to wheel 131 and configured to monitor a pressure in a tire of wheel 131. While not explicitly illustrated, it may be understood that each of the four tires indicated in FIG. 1 may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a motor electronics coolant pump (MECP) 146. MECP 146 may be used to circulate coolant to diffuse heat generated by at least electric machine 120 and electric machine 135 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, inertial sensors 199, etc. In some examples, steering angle sensor 175, sensors associated with electric machine 135 and electric machine 120, etc., may communicate information to controller 12, regarding various states of electric machine operation.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135 and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

FIG. 2 is a detailed schematic view of an axle system 200 that includes rear axle 122. Front axle 133 may be configured similarly for four wheel drive vehicles. The axle shown in FIG. 2 includes electric machine 120 of FIG. 1. Electric machine 120 is coupled to shaft 122b via shaft 216 and open differential 203, or alternatively, planetary gear set 203. Electric machine 120 is also mechanically coupled to shaft 122a via shaft 215 and open differential 202, or alternatively, planetary gear set 202. Torque vectoring electric machine 120a is arranged in parallel with electric machine 120 and torque vectoring electric machine 120a is mechanically coupled to open differentials 202 and 203, or alternatively, planetary gear sets 202 and 203 via shafts 220 and 222. Open differentials or planetary gear sets 202 and 203 are coupled to shafts 220 and 222 via gears 221 and 223. Controller 12 may command propulsive force electric machine 120 in a motor or a generator mode. Controller 12 may also command torque vectoring electric machine 120a in a motor mode to rotate a ring gear in an opposite direction of planet gears to increase torque delivered to one of drive shafts 122a and 122b and to reduce torque delivered to the other of drive shafts 122a and 122b.

Thus, the system of FIGS. 1 and 2 provides for a vehicle system, comprising: an axle system including a torque vectoring electric machine, a propulsive force electric machine, and two gear sets that couple the torque vectoring electric machine to the propulsive force electric machine; and a controller including executable instructions stored in non-transitory memory to adjust torque output of the torque vectoring electric machine via the controller in response to a speed difference between an actual wheel speed and a natural wheel speed. The vehicle system further comprises additional instructions to adjust the torque output of the torque vectoring electric machine based on a derivative of a speed difference between the actual wheel speed and the natural wheel speed. The vehicle system further comprises additional instructions to adjust a torque output of the propulsive force electric machine responsive to a driver demand wheel torque. The vehicle system includes where the natural wheel speed is based on a steering angle. The vehicle system further comprises supplying electrical power to the propulsive force electric machine and the torque vectoring electric machine via an electric energy storage device.

Referring now to FIG. 3, an example method for operating a torque vectoring axle with electrical propulsion power is shown. The method of FIG. 3 may be incorporated into and may cooperate with the system of FIGS. 1 and 2. Further, at least portions of the method of FIG. 3 may be incorporated as executable instructions stored in non-transitory memory while other portions of the method may be performed via a controller transforming operating states of devices and actuators in the physical world. The method of FIG. 3 is described for a single axle (e.g., a rear axle of a rear wheel drive vehicle), but the method may be applied to both front and rear axles. Further, the method may be applied only to the front axle if the vehicle is a front wheel drive or four wheel drive vehicle.

At 302, method 300 judges if the vehicle is activated. Method 300 may judge that the vehicle is activated if a vehicle activation request has been made via a human or autonomous driver. The vehicle activation request may be received via a human/machine interface directly receiving input from a human driver or via a key fob or other device entering a predetermined proximity of the vehicle (e.g., within 5 meters of the vehicle). If vehicle activation has been requested and vehicle systems are activated, the answer is yes and method 300 proceeds to 304. Otherwise, method 300 proceeds to 360.

At 360, method 300 deactivates the torque vectoring electric machine and one or more electrical propulsion machines. The electric machines are deactivated to conserve electrical power. Deactivating the electric machines may include deactivating one or more inverters that supply or receive electrical power from the electric machines. The electric machines and the inverters may be deactivated via ceasing to supply electrical power to the electric machines and the inverters. In one example, a power contactor of an electric energy storage device is open circuited when the vehicle is deactivated. Method 300 proceeds to exit.

At 304, method 300 determines driver demand wheel torque and applies the driver demand wheel torque to vehicle wheels. In one example, driver demand torque is determined based on accelerator pedal position and vehicle speed. In particular, accelerator pedal position and vehicle speed reference or index a table of empirically determined driver demand wheel torque values. The table outputs a unique driver demand wheel torque that is looked up via the accelerator pedal position and the vehicle speed. Method 300 proceeds to 306 after determining the driver demand wheel torque.

At 306, method 300 determines speeds of left and right driven wheels (e.g., wheels that receive torque from the propulsive force electric machine). Speeds of the left and right driven wheels may be determined via wheel speed sensors. Method 300 proceeds to 308.

At 308, method 300 determines a natural speed of each driven wheel. The natural speed of a wheel is a speed that the wheel rotates at for the present vehicle speed and steering angle when a coefficient of friction between the wheel and the ground on which the wheel is rotating is high and no slip of the wheel is present. Slip is the relative motion of the wheel to the ground or road surface on which the wheel is traveling.

In one example, a natural speed of a wheel may be determined or estimated via adjusting a reference speed of the vehicle according to steering angle and the rolling radius of the wheel. The rolling radius of the wheel is a radius from the center of the wheel to where the wheel's tire contacts the ground or road. For example, the natural speed of a left driven wheel may be determined via the following equation:

$$NWS_L = \frac{1}{2 \cdot \pi \cdot rr_L}\left(\frac{rev}{\text{kilometer}}\right) \cdot V_{ref}\left(\frac{\text{kilometers}}{hr}\right) \cdot \alpha_{Adj\_L}$$

where $NWS_L$ is the natural wheel speed for the left driven wheel, $rr_L$ is the rolling radius of the left driven wheel, $V_{ref}$ is the vehicle reference speed, and $\alpha_{Adj\_L}$ is an empirically determined adjustment factor for the left driven wheel that provides compensation for the steering wheel angle. In one example, the value of $\alpha Adj\_L$ is output from a table that is referenced via yaw rate or via steering angle and vehicle speed. The vehicle reference speed may be determined via the vehicle's wheel speed sensors and a longitudinal accelerometer as known in the art. In one example, the vehicle reference speed may be determined directly from wheel speed sensor output when the absolute value of wheel acceleration is less than a threshold, where the threshold is vehicle acceleration as indicted by an accelerometer. However, if the absolute value of wheel acceleration is greater than the threshold value, then a most recent vehicle reference speed that was derived from wheel speed sensor output may be adjusted responsive to acceleration of the vehicle as determined via an accelerometer. Values for $\alpha_{Adj\_L}$ may be determined via driving the vehicle on a skid pad with the steering wheel adjusted to a fixed angle. Adjustment factor values in the table may be increased or decreased such that the natural speed of the particular wheel is equal to the reference vehicle speed. The vehicle reference speed may be determined via a global positioning system or a fifth wheel when values in the $\alpha_{Adj\_L}$ table are being adjusted. Natural wheel speeds for the right wheel may be determined in a similar way. Further, if the vehicle includes two driven axles, left and right natural wheel speeds for the second driven axle may be determined in a similar way. It should be noted that natural speeds of the driven wheels may be determined in other known ways including empirically or via vehicle suspension kinematics and vehicle geometry. Method 300 proceeds to 310.

At 310, method 300 judges if the vehicle is negotiating a left turn or if a left driven wheel is slipping. In one example, method 300 may judge that the vehicle is turning left according to a position of a steering wheel. For example, a steering angle of zero may indicate that the vehicle is not turning. A steering angle of 10 degrees may indicate that the vehicle is turning. Method 300 may judge that the left driven wheel is slipping if speed of the left driven wheel is not within a threshold speed of the natural wheel speed of the left driven wheel. If method 300 judges that the vehicle is negotiating a left turn or if the left driven wheel is slipping, the answer is yes and method 300 proceeds to 320. If method 300 judges that the vehicle is not negotiating a left turn or the left driven wheel is not slipping, the answer is no and method 300 proceeds to 312.

At 320, method 300 judges if the difference between the left driven wheel speed (LWS) and the natural wheel speed of the left wheel ($NWS_L$) is greater than a threshold speed (e.g., 5 kilometers per hour), then the answer is yes and method 300 proceeds to 322. Otherwise, the answer is no and method 300 proceeds to 321. The speed difference may be expressed as:

Speed_dif=LWS−$NWS_L$ where Speed_dif is the speed difference value, LWS is left wheel speed, and $NWS_L$ is the natural wheel speed of the left driven wheel.

At 321, method 300 deactivates the torque vectoring electric machine to conserve electrical energy. The torque vectoring electric machine may not output a torque when it is deactivated and electrical energy may not be provided to the torque vectoring electric machine when it is deactivated. However, the inverter that may supply electrical energy to the torque vectoring electric machine may remain activated so that electrical energy may be supplied to the torque vectoring electric machine if the wheel speed difference between LWS and $NWS_L$ increases. Method 300 also outputs the driver demand wheel torque via the propulsive force electric machine of the axle by commanding the propulsive force electric machine to output the driver demand wheel torque. Method 300 proceeds to exit.

At 322, method 300 activates the torque vectoring electric machine. The torque vectoring electric machine may be activated by supplying electrical energy to the torque vectoring electric machine. The electrical energy may be supplied via the electric energy storage device and an inverter. Method 300 proceeds to 324.

At 324, method 300 adjusts torque output of the torque vectoring electric machine responsive to the speed differenced determined at 320. In particular, the torque of the torque vectoring electric machine may be adjusted according to the following equation:

$$TV\_tor = K_p \cdot \frac{d(Speed\_dif)}{dt} + T_0$$

where Tv_tor is the torque vectoring electric machine torque command value, $K_p$ is a proportional gain (e.g., a scalar or a real number), Speed_dif is the speed difference determined at 320, d(Speed_dif)/dt is the derivative of the speed difference determined at 320, and $T_0$ is a predetermined value of a real number. The values of $K_p$ and $T_0$ may be determined via entering the vehicle into a turn and incrementally adjusting the values. Method 300 proceeds to 326.

At 326, method 300 commands the propulsive force electric machine to the driver demand wheel torque and the torque vectoring electric machine is commanded to the value Tv_tor. Method 300 proceeds to 328.

At 328, method 300 judges if the difference between the right driven wheel speed (RWS) and the natural wheel speed of the right wheel ($NWS_R$) is greater than a threshold speed (e.g., 5 kilometers per hour), then the answer is yes and method 300 proceeds to 329. Otherwise, the answer is no and method 300 proceeds to 330. The speed difference may be expressed as:

$$Speed\_dif = RWS - NWS_R$$

where Speed_dif is the speed difference value, RWS is right wheel speed, and $NWS_R$ is the natural wheel speed of the right driven wheel.

At 329, method 300 reduces the torque vectored to the right driven wheel via reducing torque of the torque vectoring electric machine. Method 300 proceeds to exit.

At 330, method 300 determines the speed of the left driven wheel speed. Method 300 returns to 320 after determining the left driven wheel speed. Method 300 may also determine the right driven wheel speed.

At 312, method 300 judges if the vehicle is negotiating a right turn or if a right driven wheel is slipping. In one example, method 300 may judge that the vehicle is turning right according to a position of a steering wheel. Method 300 may judge that the right driven wheel is slipping if speed of the right driven wheel is not within a threshold speed of the natural wheel speed of the right wheel. If method 300 judges that the vehicle is negotiating a right turn or if the right driven wheel is slipping, the answer is yes and method 300 proceeds to 340. If method 300 judges that the vehicle is not turning right or the right driven wheel is not slipping, the answer is no and method 300 proceeds to 314.

At 314, method 300 deactivates the torque vectoring electric machine to conserve electrical energy. The torque vectoring electric machine may not output a torque when it is deactivated and electrical energy may not be provided to the torque vectoring electric machine when it is deactivated. However, the inverter that may supply electrical energy to the torque vectoring electric machine may remain activated so that electrical energy may be supplied to the torque vectoring electric machine if the wheel speed difference between RWS and NWS increases. Method 300 also outputs the driver demand wheel torque via the propulsive force electric machine of the axle by commanding the propulsive force electric machine to output the driver demand wheel torque. Method 300 proceeds to exit.

At 340, method 300 judges if the difference between the right driven wheel speed (RWS) and the natural wheel speed ($NWS_R$) is greater than a threshold speed (e.g., 5 kilometers per hour), then the answer is yes and method 300 proceeds to 342. Otherwise, the answer is no and method 300 proceeds to 341. The speed difference may be expressed as:

$$Speed\_dif = RWS - NWS_R$$

where Speed_dif is the speed difference value, RWS is right wheel speed, and $NWS_R$ is the natural wheel speed of the right driven wheel.

At 341, method 300 deactivates the torque vectoring electric machine to conserve electrical energy. The torque vectoring electric machine may not output a torque when it is deactivated and electrical energy may not be provided to the torque vectoring electric machine when it is deactivated. However, the inverter that may supply electrical energy to the torque vectoring electric machine may remain activated so that electrical energy may be supplied to the torque vectoring electric machine if the wheel speed difference between RWS and $NWS_R$ increases. Method 300 also outputs the driver demand wheel torque via the propulsive force electric machine of the axle by commanding the propulsive force electric machine to output the driver demand wheel torque. Method 300 proceeds to exit.

At 342, method 300 activates the torque vectoring electric machine. The torque vectoring electric machine may be activated by supplying electrical energy to the torque vectoring electric machine. The electrical energy may be supplied via the electric energy storage device and an inverter. Method 300 proceeds to 344.

At 344, method 300 adjusts torque output of the torque vectoring electric machine responsive to the speed differenced determined at 340. In particular, the torque of the torque vectoring electric machine may be adjusted according to the following equation:

$$TV\_tor = K_p \cdot \frac{d(Speed\_dif)}{dt} + T_0$$

where Tv_tor is the torque vectoring electric machine torque command value, $K_p$ is a proportional gain (e.g., a scalar), Speed_dif is the speed difference determined at 340, d(Speed_dif)/dt is the derivative of the speed difference determined at 340, and $T_0$ is a predetermined value of a real number. The values of $K_p$ and $T_0$ may be determined via entering the vehicle into a turn and incrementally adjusting the values. Method 300 proceeds to 346.

At 346, method 300 commands the propulsive force electric machine to the driver demand wheel torque and the torque vectoring electric machine is commanded to the value Tv_tor. Method 300 proceeds to 348.

At 348, method 300 judges if the difference between the left driven wheel speed (LWS) and the natural wheel speed of the left wheel ($NWS_L$) is greater than a threshold speed (e.g., 5 kilometers per hour), then the answer is yes and method 300 proceeds to 349. Otherwise, the answer is no and method 300 returns to 340. The speed difference may be expressed as:

$$\text{Speed\_dif} = \text{LWS} - \text{NWS}_L$$

where Speed_dif is the speed difference value, LWS is left wheel speed, and NWS is the natural wheel speed of the left driven wheel.

At 349, method 300 reduces the torque vectored to the right driven wheel via reducing torque of the torque vectoring electric machine. Method 300 proceeds to exit.

At 350, method 300 determines the speed of the right driven wheel speed. Method 300 returns to 340 after determining the right driven wheel speed. Method 300 may also determine the left driven wheel speed.

In this way, torque may be vectored to a wheel of an axle that is not slipping from a wheel that is slipping without reducing the vehicle's speed and wasting propulsive effort. A torque vectoring electric machine torque may be adjusted as a function of a speed difference between a wheel speed and a natural wheel speed.

Thus, the method of FIG. 3 provides for a vehicle operating method, comprising: adjusting torque output of a torque vectoring electric machine via a controller in response to a speed difference between an actual wheel speed and a natural wheel speed. The method includes where the actual wheel speed is determined via a wheel speed sensor. The method includes where the natural wheel speed is determined via a steering wheel angle. The method includes where the natural wheel speed is further determined via a lookup table. The method includes where the torque vectoring electric machine is arranged in parallel with a propulsive force electric machine. The method further comprises adjusting torque output of the propulsive force electric machine based on a driver demand wheel torque. The method includes where torque output of the torque vectoring electric machine is delivered to an open differential or a planetary gear set. The method further comprises deactivating the torque vectoring electric machine when the speed difference is less than a threshold amount.

The method of FIG. 3 also provides for a vehicle operating method, comprising: adjusting torque output of a torque vectoring electric machine to a torque that is based on a derivative of a speed difference between an actual wheel slip and a natural wheel slip via a controller in response to the speed difference between the actual wheel speed and the natural wheel speed exceeding a threshold. The method further comprises multiplying the derivative of the speed difference by a scalar (e.g., a real number). The method further comprises adding a predetermined value to the derivative of the speed difference multiplied by the scalar. The method further comprises activating the torque vectoring electric machine in response to the speed difference. The method further comprises deactivating the torque vectoring electric machine in response to the speed difference between the actual wheel speed and the natural wheel speed being less than the threshold. The method further comprises adjusting a torque of a propulsive electric machine responsive to a driver demand wheel torque. The method includes where the natural wheel speed is based on a steering angle.

Referring now to FIG. 4, a prophetic operating sequence according to the method of FIG. 3 is shown. The vehicle operating sequence shown in FIG. 4 may be provided via the method of FIG. 3 in cooperation with the system shown in FIGS. 1 and 2. The plots shown in FIG. 4 occur at the same time and are aligned in time. In this example, the driver demand wheel torque is constant and not shown throughout the sequence.

The first plot from the top of FIG. 4 is a plot of vehicle turning direction versus time. The vertical axis represents vehicle turning direction and the vehicle is turning right when trace 402 is at a higher level near the vertical axis arrow that is pointing upward. The vehicle is turning left when trace 402 is at a lower level near the vertical axis arrow that is pointing downward. The vehicle is not turning when trace 402 is at the level of the horizontal axis. The horizontal axis represents time and time increases from the left side of the figure to the right side of the figure. Trace 402 represents the vehicle turning direction.

The second plot from the top of FIG. 4 is a plot of right wheel slip versus time. The vertical axis represents right wheel slip and the amount of wheel slip increases in the direction of the vertical axis arrow. The horizontal axis represents time and time increases from the left side of the figure to the right side of the figure. Horizontal line 450 represents a threshold wheel slip amount. Trace 404 represents right wheel slip. Wheel slip is zero when trace 404 is near the horizontal axis.

The third plot from the top of FIG. 5 is a plot of left wheel slip versus time. The vertical axis represents left wheel slip and the amount of wheel slip increases in the direction of the vertical axis arrow. The horizontal axis represents time and time increases from the left side of the figure to the right side of the figure. Horizontal line 452 represents a threshold wheel slip amount. Trace 406 represents right wheel slip. Wheel slip is zero when trace 406 is near the horizontal axis.

The fourth plot from the top of FIG. 4 is a plot of right wheel torque versus time. The vertical axis represents right wheel torque and right wheel torque increases in the direction of the vertical axis arrow. The horizontal axis represents time and time increases from the left side of the figure to the right side of the figure. Trace 408 represents right wheel torque.

The fifth plot from the top of FIG. 4 is a plot of left wheel torque versus time. The vertical axis represents left wheel torque and left wheel torque increases in the direction of the vertical axis arrow. The horizontal axis represents time and time increases from the left side of the figure to the right side of the figure. Trace 410 represents left wheel torque.

The sixth plot from the top of FIG. 4 is a plot of torque vectoring electric machine operating state versus time. The vertical axis represents torque vectoring electric machine operating state and the torque vectoring electric machine is activated when trace 412 is at a higher level near the vertical axis arrow. The torque vectoring electric machine is not activated when trace 412 is at a lower level near the horizontal axis.

At time t0, the vehicle is not turning and the right and left wheels are not slipping. A middle level of torque is delivered to the right wheel and left wheel according to the driver demand torque (not shown). The torque vectoring electric machine is not activated.

At time t1, the vehicle begins to turn right and the right wheel begins to slip shortly thereafter. The torque vectoring electric machine is activated and begins transferring torque from the right wheel to the left wheel shortly after the right wheel slip amount exceeds threshold 450 after time t1, where the right wheel slip is RWS-NWS$_R$. The right wheel torque amount is reduced and the left wheel torque amount is increased shortly after time t1 via adjusting torque output of the torque vectoring electric machine (not shown).

At time t2, the vehicle exits to right turn and the right wheel slip is reduced to zero shortly thereafter. The torque vectoring electric machine is deactivated to conserve electrical energy and the right and left wheel torques are equalized via reducing torque output of the torque vectoring electric machine to zero (not shown).

At time t3, the vehicle begins to turn left and the left wheel begins to slip shortly thereafter. The torque vectoring electric machine is activated and begins transferring torque from the left wheel to the right wheel shortly after the left wheel slip amount exceeds threshold 450 after time t3, where the left wheel slip is LWS-NWS$_L$. The left wheel torque amount is reduced and the right wheel torque amount is increased shortly after time t3 via adjusting torque output of the torque vectoring electric machine (not shown).

At time t4, the vehicle exits to left turn and the left wheel slip is reduced to zero shortly thereafter. The torque vectoring electric machine is deactivated to conserve electrical energy and the right and left wheel torques are equalized via reducing torque output of the torque vectoring electric machine to zero (not shown).

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
adjusting a torque output of a torque vectoring electric machine via a controller in response to a speed difference between an actual wheel speed of a vehicle wheel and a natural wheel speed of the vehicle wheel, the natural wheel speed determined via a steering wheel angle, based on a torque command value of the torque vectoring electric machine determined by multiplying a derivative of the speed difference by a scalar and adding a predetermined value to the derivative of the speed difference multiplied by the scalar.

2. The method of claim 1, where the actual wheel speed is determined via a wheel speed sensor.

3. The method of claim 1, where the natural wheel speed is further determined via a lookup table.

4. The method of claim 1, where the torque vectoring electric machine is arranged in parallel with a propulsive force electric machine.

5. The method of claim 4, further comprising adjusting a torque output of the propulsive force electric machine based on a driver demand wheel torque.

6. The method of claim 1, where the torque output of the torque vectoring electric machine is delivered to an open differential or a planetary gear set.

7. The method of claim 1, further comprising deactivating the torque vectoring electric machine when the speed difference is less than a threshold amount.

8. A vehicle operating method, comprising:
adjusting a torque output of a torque vectoring electric machine to a torque that is based on a derivative of a speed difference between an actual wheel speed of a vehicle wheel and a natural wheel speed of the vehicle wheel via a controller in response to the speed difference between the actual wheel speed and the natural wheel speed exceeding a threshold, the torque that is based on the derivative of the speed difference determined by multiplying the derivative of the speed difference by a scalar and adding a predetermined value to the derivative of the speed difference multiplied by the scalar.

9. The method of claim 8, further comprising activating the torque vectoring electric machine in response to the speed difference.

10. The method of claim 9, further comprising deactivating the torque vectoring electric machine in response to the speed difference between the actual wheel speed and the natural wheel speed being less than the threshold.

11. The method of claim 8, further comprising adjusting a torque of a propulsive electric machine responsive to a driver demand wheel torque.

12. The method of claim 8, where the natural wheel speed is based on a steering angle.

13. A vehicle system, comprising:
an axle system including a torque vectoring electric machine, a propulsive force electric machine, and two gear sets that couple the torque vectoring electric machine to the propulsive force electric machine; and
a controller including executable instructions stored in non-transitory memory to adjust a torque output of the torque vectoring electric machine via the controller based on a derivative of a speed difference between an actual wheel speed of a vehicle wheel and a natural wheel speed of the vehicle wheel, including multiplying the derivative of the speed difference by a scalar and adding a predetermined value to the derivative of the speed difference multiplied by the scalar, in response to the speed difference between the actual wheel speed of the vehicle wheel and the natural wheel speed of the vehicle wheel.

14. The vehicle system of claim 13, further comprising additional instructions to adjust a torque output of the propulsive force electric machine responsive to a driver demand wheel torque.

15. The vehicle system of claim 13, where the natural wheel speed is based on a steering angle.

16. The vehicle system of claim 13, further comprising supplying electrical power to the propulsive force electric machine and the torque vectoring electric machine via an electric energy storage device.

* * * * *